(12) United States Patent
Baraszu et al.

(10) Patent No.: US 9,065,278 B2
(45) Date of Patent: Jun. 23, 2015

(54) SYSTEMS AND METHODS FOR EVALUATING AND CONTROLLING A BATTERY SYSTEM

(71) Applicant: GM GLOBAL TECHNOLOGY OPERATIONS LLC, Detroit, MI (US)

(72) Inventors: Robert C. Baraszu, Dearborn, MI (US); Kurt M. Johnson, Brighton, MI (US); Zachary D. Bylsma, Rochester Hills, MI (US); Damon R. Frisch, Troy, MI (US); George Robison, Bloomfield Hills, MI (US); Ashley McAllister, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 312 days.

(21) Appl. No.: 13/747,275

(22) Filed: Jan. 22, 2013

(65) Prior Publication Data

US 2014/0203785 A1 Jul. 24, 2014

(51) Int. Cl.
*H02J 7/00* (2006.01)
(52) U.S. Cl.
CPC ................ *H02J 7/00* (2013.01); *Y02T 10/7005* (2013.01)

(58) Field of Classification Search
USPC .................. 320/124–131, 136–137, 151–152
See application file for complete search history.

(56) References Cited

U.S. PATENT DOCUMENTS 5,714,866 A * 2/1998 S et al. .......................... 320/152

* cited by examiner

*Primary Examiner* — Paul Dinh
(74) *Attorney, Agent, or Firm* — Phillips Ryther & Winchester; Jared L. Cherry

(57) ABSTRACT

Systems and methods for estimating the relative capacity of individual battery subdivisions in a battery system are presented. In some embodiments, a system may include calculation system configured to analyze the electrical parameters to generate derivative values of the parameters over a period of time. The calculation system may further calculate summation values associated with individual battery subdivisions based upon the derivate values. A battery control system may utilize the summation values to generate one or more commands configured to control an aspect of an operation of the battery pack based on using the summation values. The summation values associated with battery subdivisions may be used to determine a relative capacity for storing electrical energy, according to some embodiments. The determination of relative capacity may be used by a control system to prevent over-discharge of a battery subdivision having the lowest energy storage capacity.

20 Claims, 5 Drawing Sheets

SYSTEMS AND METHODS FOR EVALUATING AND CONTROLLING A BATTERY SYSTEM

TECHNICAL FIELD

The systems and methods disclosed herein relate to protecting against over-discharge of a battery system. More specifically, the systems and methods of the present disclosure relate to estimating the relative capacity of individual battery subdivisions. Parameters associated with one or more subdivisions exhibiting reduced capacity or other criteria may be used to estimate battery control parameters.

BACKGROUND

Passenger vehicles often include electric batteries for operating a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like).

Battery discharge may terminate when the battery is depleted or at a threshold established by a battery control system. The threshold for terminating further battery discharge may be based on a monitored voltage or other parameters of the battery as a whole. Failure to restrict further discharge of the battery below an over-depletion threshold may result in battery system inefficiencies, degradation, permanent damage and/or a shortened usable lifespan.

SUMMARY

A battery system according to various embodiments of the present disclosure may include a plurality of subdivisions, such as battery cells or sub-packs. Over extended periods of use, different battery subdivisions may develop differences in capacities, states of charge, discharge rates, impedances, and/or voltages. Consistent with embodiments disclosed herein, a battery system may include a measurement system configured to determine a subdivision electrical parameter associated with each of a plurality of subdivisions. A battery control system may identify a subdivision satisfying a criterion based on the plurality of subdivision electrical parameters. For example, the systems and methods disclosed herein may detect a battery subdivision satisfying certain criteria (e.g., the weakest or lowest capacity subdivision) within a battery pack for the purpose of utilizing that subdivision's electrical characteristics to estimate battery control parameters.

According to various embodiments, the weakest subdivision may refer to a battery cell having the lowest electrical storage capacity, the highest electrical resistance, or other characteristic depending on the battery chemistry. In some instances, the subdivision having the highest electrical resistance may also be the cell having the lowest capacity, while in other cases this relation does not hold.

Various systems and methods disclosed herein may be utilized in connection with a battery system that includes a plurality of subdivisions. A measurement system associated with the battery system may be configured to determine subdivision electrical parameters associated with each of a plurality of subdivisions. The electrical parameters may be used by a calculation system to generate derivative values of the parameters over a period of time. The calculation system may further calculate summation values associated with individual battery subdivisions based on the derivate values.

A battery control system may utilize the summation values to generate one or more commands configured to control an aspect of an operation of the battery pack based using the summation values. In some embodiments, the summation values associated with battery subdivisions may be used to determine a relative capacity for storing electrical energy. The determination of relative capacity may be used by the control system to prevent over-discharge of a battery subdivision having the lowest energy storage capacity. Embodiments that identify the weakest subdivision within a battery and utilize the electrical characteristics of the weakest subdivision to estimate battery control parameters may consequently protect weak cells from over-discharge and the attendant damage that may be caused by over-discharge. In some situations, damage caused by over-discharge may permanently impair the function of the battery pack and/or the over-discharged battery subdivisions.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
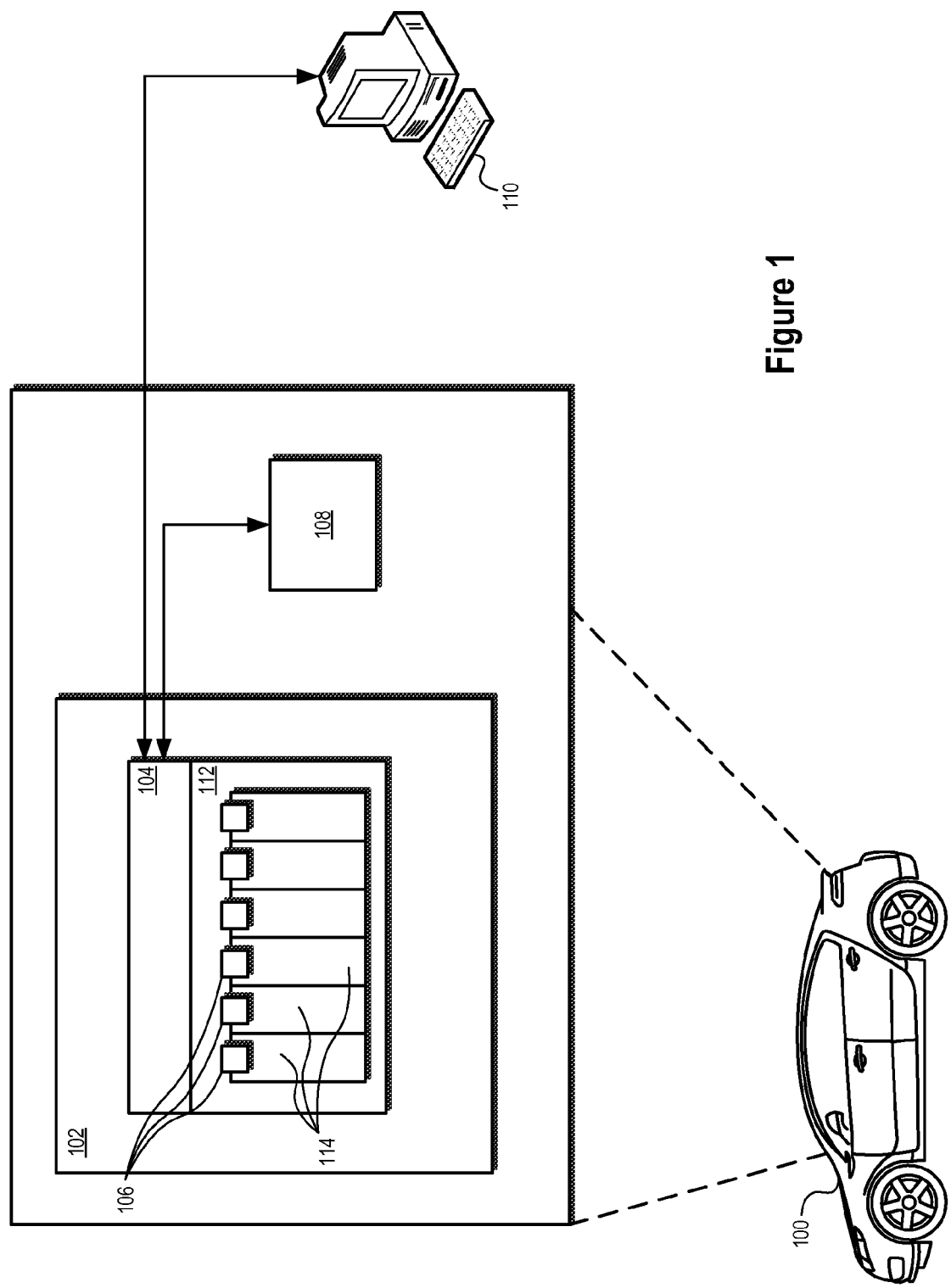
FIG. 1 illustrates a block diagram of a battery system in a vehicle consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Battery packs for hybrid and purely electric vehicles may include a plurality of subdivisions. For example, a vehicle battery system may include a battery pack that comprises one or more sub-packs or battery cells. The term subdivision, as used herein, may refer to either a sub-pack or a battery cell, or to a plurality of sub-packs or battery cells that together constitute a battery pack.

A battery having a plurality of subdivisions may provide efficiencies in packaging, manufacturability, and serviceability. In battery packs comprising multiple subdivisions, each subdivision may be individually replaceable. Individual subdivisions may fail or require replacement for a variety of reasons. In a battery system in which individual subdivisions are not individually replaceable, when one or more subdivisions fails or requires replacement, it may be necessary to replace the entire battery. The cost of replacing the entire battery may exceed the cost of replacing only one or more subdivisions. Accordingly, cost savings may be realized where a problem with a battery may be remedied by replacing one or more subdivisions rather than replacing the entire battery.

Individual subdivisions may exhibit different electrical characteristics as a result of replacement of one or more subdivisions, variations among subdivisions in a battery at the time of manufacture, or other issues. Such characteristics may include differences in energy storage capacity, voltage, current, impedance, and the like. For example, in a circumstance in which a subdivision is replaced in a battery after considerable use, the newly replaced subdivision may have greater capacity than other subdivisions, whose capacity may have diminished over time and as a result of use.

A control system may monitor the condition of a battery while in use in order to prevent over-discharge of the battery and/or over-discharge of one or more individual subdivisions. Over-discharge of a battery may result in damage to the battery and, accordingly, mitigating and/or preventing over-discharge of a battery is desirable. Further, given that individual subdivisions in a battery may exhibit differences in capacity, some subdivisions may become over-discharged before other sections are over-discharged and even before the battery as a whole is over-discharged. Individual monitoring and protection against over-discharge of individual subdivisions may be of greater concern after one or more subdivisions in a battery are replaced because the newly replaced subdivision may be able to store greater amounts of electrical energy, and thus, other subdivisions may become over-depleted before the newly replaced subdivision.

The systems and methods disclosed herein may detect a battery subdivision satisfying certain criteria (e.g., the lowest capacity subdivision, highest electrical resistance, etc.) within a battery pack for the purpose of utilizing that subdivision's electrical characteristics to estimate battery control parameters. Embodiments that identify a weak or low capacity subdivision within a battery and utilize the electrical characteristics of the weak subdivision in order to estimate battery control parameters may consequently protect weak cells from over-discharge and resulting damage. Such damage may further compound the reduction in the amount of energy a low-capacity subdivision may be able to store. Accordingly, the capacity of an already lower-capacity subdivision may degrade at an accelerated rate with respect to other subdivisions that have an average or above-average energy storage capacity if the lower-capacity subdivision is damaged from over-discharge.

FIG. 1 illustrates a block diagram of a battery system 102 in a vehicle 100 consistent with embodiments disclosed herein. The vehicle 100 may be a motor vehicle, a marine vehicle, an aircraft, and/or any other type of vehicle, and may include an internal combustion engine ("ICE") drivetrain, an electric motor drivetrain, a hybrid engine drivetrain, an FC drivetrain, and/or any other type of drivetrain suitable for incorporating the systems and methods disclosed herein. The vehicle 100 may include a battery system 102 that, in certain embodiments, may be an HV battery system. The HV battery system may be used to power electric drivetrain components (e.g., as in an electric, hybrid, or FC power system). In further embodiments, the battery system 102 may be a low voltage battery (e.g., a lead-acid 12V automotive battery) and may be configured to supply electric energy to a variety of vehicle 100 systems including, for example, vehicle starter systems (e.g., a starter motor), lighting systems, ignition systems, and/or the like.

The battery system 102 may include a battery control system 104. The battery control system 104 may be configured to monitor and control certain operations of the battery system 102. For example, the battery control system 104 may be configured to monitor and control charging and discharging operations of the battery system 102. In certain embodiments, the battery control system 104 may be communicatively coupled with one or more sensors 106 (e.g., voltage sensors, current sensors, and/or the like, etc.) and/or other systems configured to enable the battery control system 104 to monitor and control operations of the battery system 102. For example, sensors 106 may provide battery control system 104 with information used to estimate a state of charge of the battery system 102 and/or its constituent components. The battery control system 104 may further be configured to provide information to and/or receive information from other systems included in the vehicle 100. For example, the battery control system 104 may be communicatively coupled with an internal vehicle computer system 108 and/or an external computer system 110 (e.g., via a wireless telecommunications system or the like). In certain embodiments, the battery control system 104 may be configured, at least in part, to provide information regarding the battery system 102 to a user of the vehicle 100, vehicle computer system 108, and/or external computer system 110. Such information may include, for example, battery state of charge information, battery operating time information, battery operating temperature information, and/or any other information regarding the battery system 102.

The battery system 102 may include one or more battery packs 112 suitably sized to provide electrical power to the vehicle 100. Each battery pack 112 may include one or more subdivisions 114. The subdivisions 114 may comprise sub-packs, each of which may comprise one or more battery cells utilizing any suitable battery technology. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies.

Each subdivision 114 may be associated with a sensor 106 configured to measure one or more electrical parameters (e.g., voltage, current, impedance, state of charge, etc.) associated with each battery subdivision 114. Although FIG. 1 illustrates separate sensors 106 associated with each battery section 114, in some embodiments a sensor configured to measure various electrical parameters associated with a plurality of subdivisions 114 may also be utilized. The electrical parameters measured by sensor 106 may be provided to battery control system 104. Using the electrical parameters, battery control system 104 and/or any other suitable system may coordinate the operation of battery system 102.

An indication regarding differences between various subdivisions 114 may be provided. Such differences may include, for example, variations in the voltage of each subdivision 114, differences in the amount of current that can be sourced from each subdivision 114, differences in the capacity of each subdivision 114, etc. With this information, a user of the vehicle 100 and/or external computer system 110 may diagnose potential problems with battery system 102. Subdivisions 114 exhibiting undesirable characteristics may be replaced in order to prolong the useful life of battery system 102 as a whole.

Figure 2:
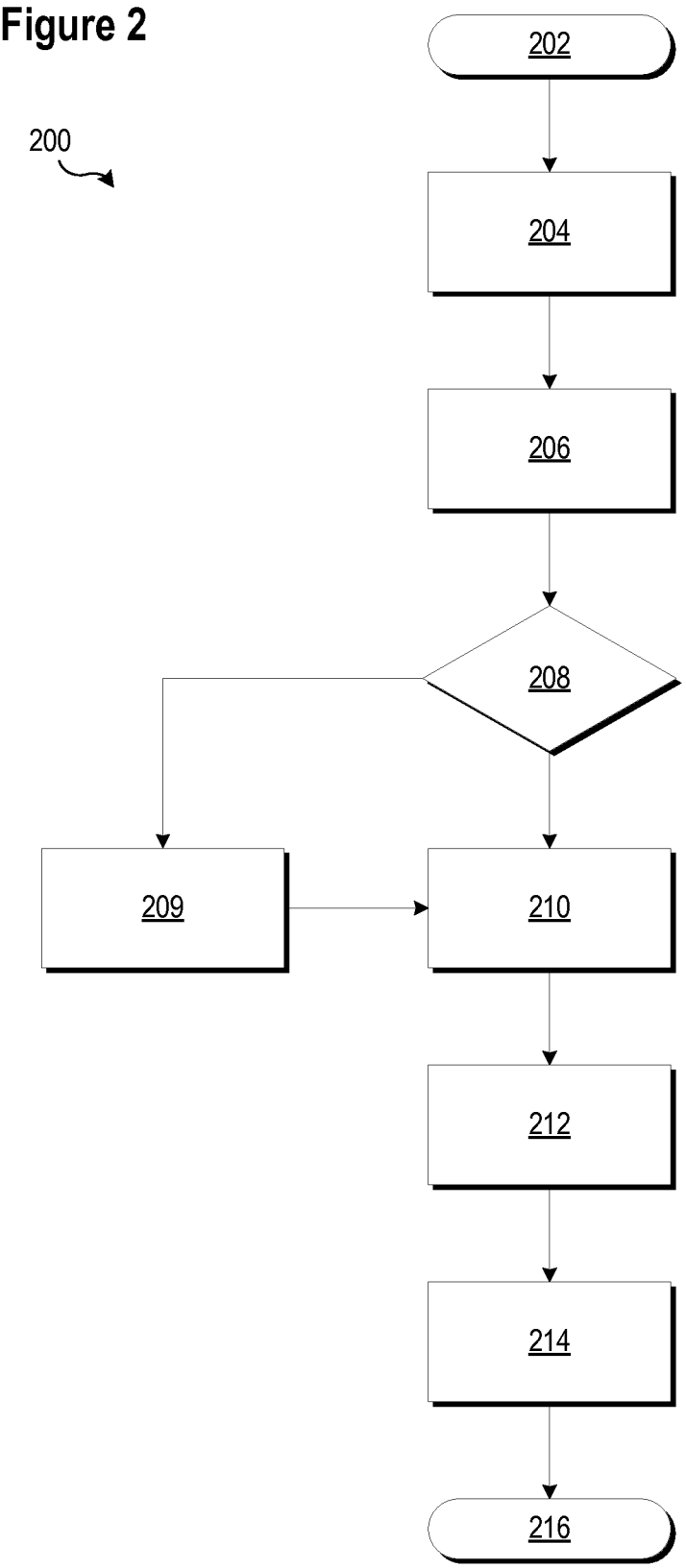
FIG. 2 illustrates a flowchart of a method for evaluating and/or controlling a battery system according to various embodiments consistent with the present disclosure.

FIG. 2 illustrates a flowchart of a method 200 for evaluating and/or controlling a battery system according to various embodiments consistent with the present disclosure. In certain embodiments, the illustrated method 200 may be performed using, at least in part, a battery control system, an internal vehicle computer system, an external computer system, and/or one or more sensors as disclosed herein. In further embodiments, any other system or systems may be utilized.

Method 200 may begin at 202. At 204, electrical parameters associated with one or more subdivisions in a battery system may be acquired. According to some embodiments, the electrical parameters may include measurement of voltage, current, impedance, and other electrical characteristics. The electrical parameters may be acquired, at least in part, using a plurality of sensors in communication with one or more battery subdivisions. In certain embodiments, such sensors may be in electrical communication with a control system. Further, the sensors may be configured to communicate the electrical parameters to a control system.

At 206, an analysis of a plurality of electrical parameters may be undertaken. According to one embodiment involving an analysis of voltage measurements associated with a plurality of battery subdivisions, a derivative may be calculated for each electrical parameter using Eq. 1.

$$dV_i(k)=V_i(k)-V_i(k-1)$$ Eq. 1

In Eq. 1, the subscript variable i may refer to a particular battery subdivision, while the variable k may refer to a particular sequence number for a time associated with a particular measurement. According to some embodiments, measurements of an electrical parameter may occur at a fixed time interval, and accordingly, a specific time associated with a particular sequence number may be determined by multiplying the fixed time interval by the sequence number.

Certain embodiments consistent with the present disclosure may analyze data associated with all subdivisions in a battery system, while other embodiments may analyze fewer than all subdivisions in a battery system. In other words, according to some embodiments, fewer than all subdivisions in a battery system may be analyzed. For example, each section of a battery pack may include a representative subdivision that is analyzed utilizing method 200. Electrical conditions associated with subdivisions that are not specifically analyzed may be estimated or inferred based upon the values associated with analyzed subdivisions.

At 208, method 200 may determine whether a minimum of the values calculated at 206 exceeds a particular threshold. According to some embodiments, the threshold may correspond to a detection threshold or a noise threshold. Stated in other words, if the minimum value of the data set calculated at 206 exceeds the threshold, method 200 may continue to 210. Otherwise, if the minimum value of the data set calculated at 206 does not exceed the threshold, certain data values below the threshold may be excluded from further analysis at 209. Analysis of the remaining data values may proceed at 210. The threshold value may vary according to certain embodiments, depending upon a number of parameters and factors. For example, the threshold may vary based upon the sensitivity of sensors used to obtain the electrical parameters involved in various calculations.

Continuing the example introduced above, in which the plurality of electrical parameters correspond to voltage measurements associated with a plurality of battery subdivisions, Eq. 2 may be evaluated at 208. If the result of Eq. 2 is true, method 200 may continue from 208 to 210. If the result of Eq. 2 is false, data values below the threshold may be excluded from the data set at 209.

$$\min(dV_i(k))>\text{Threshold}$$ Eq. 2

At 210, method 200 may generate a summation value associated with a particular battery subdivision. The summation value may involve the value calculated at 206. According to some embodiments, each value determined at 206 may be summed to create the summation value. Again, returning to the example introduced above in which the plurality of electrical parameters correspond to voltage measurements associated with a plurality of battery subdivisions, Eq. 3 may be evaluated at 210.

$$\Sigma dV_i(k)=dV_i(k)+\Sigma dV_i(k-1)$$ Eq. 3

According to some embodiments, summation values may be stored over a plurality of driving sessions. For example, summation values associated with a plurality of subdivisions may be calculated during a first driving session and stored on a non-volatile or non-transitory computer-readable storage medium. In a subsequent driving session, the summation values from the first driving session may be a starting point for calculation of summation values during the second driving session. According to still further embodiments, rather than retaining the summation values, individual measurements from which the summation values are calculated may be stored.

At 212, a relative assessment of analyzed battery subdivisions may be generated. According to some embodiments, the relative assessment may provide a relative indication of the electrical storage capacity of each analyzed subdivision. Again, returning to the example introduced above in which the plurality of electrical parameters correspond to voltage measurements associated with a plurality of battery subdivisions, the summation value calculated using Eq. 3 may be proportional to the electrical resistance associated with the respective battery subdivision. An evaluation of a battery subdivision's electrical resistance may provide an indication of the battery subdivision's capacity for storing electrical energy. A relatively high electrical resistance may provide an indication that the associated battery subdivision has a relatively low capacity for storing electrical energy. A relatively low electrical resistance may provide an indication that the associated battery subdivision has a relatively high capacity for storing electrical energy. According to some embodiments, the data generated using Eq. 3 may be sorted at 212 to provide a relative indication of the capacity of each analyzed battery subdivision with respect to each other analyzed battery subdivision.

One or more control actions may be implemented at 214 based upon the relative assessment generated at 212. As noted above, according to some embodiments the relative assessment may comprise an assessment of the relative capacity of one subdivision with respect to another subdivision or with respect to a plurality of other subdivisions. In such embodiments, a control system may restrict further depletion of a battery system based upon an estimated state of charge of the lowest capacity battery subdivision. Preventing further discharge when the lowest capacity subdivision reaches a threshold state of charge may prevent over-discharge of all battery subdivisions, since the lowest capacity subdivision may become over-discharged before any other battery subdivision. Method 200 may terminate at 216.

Figure 3A:
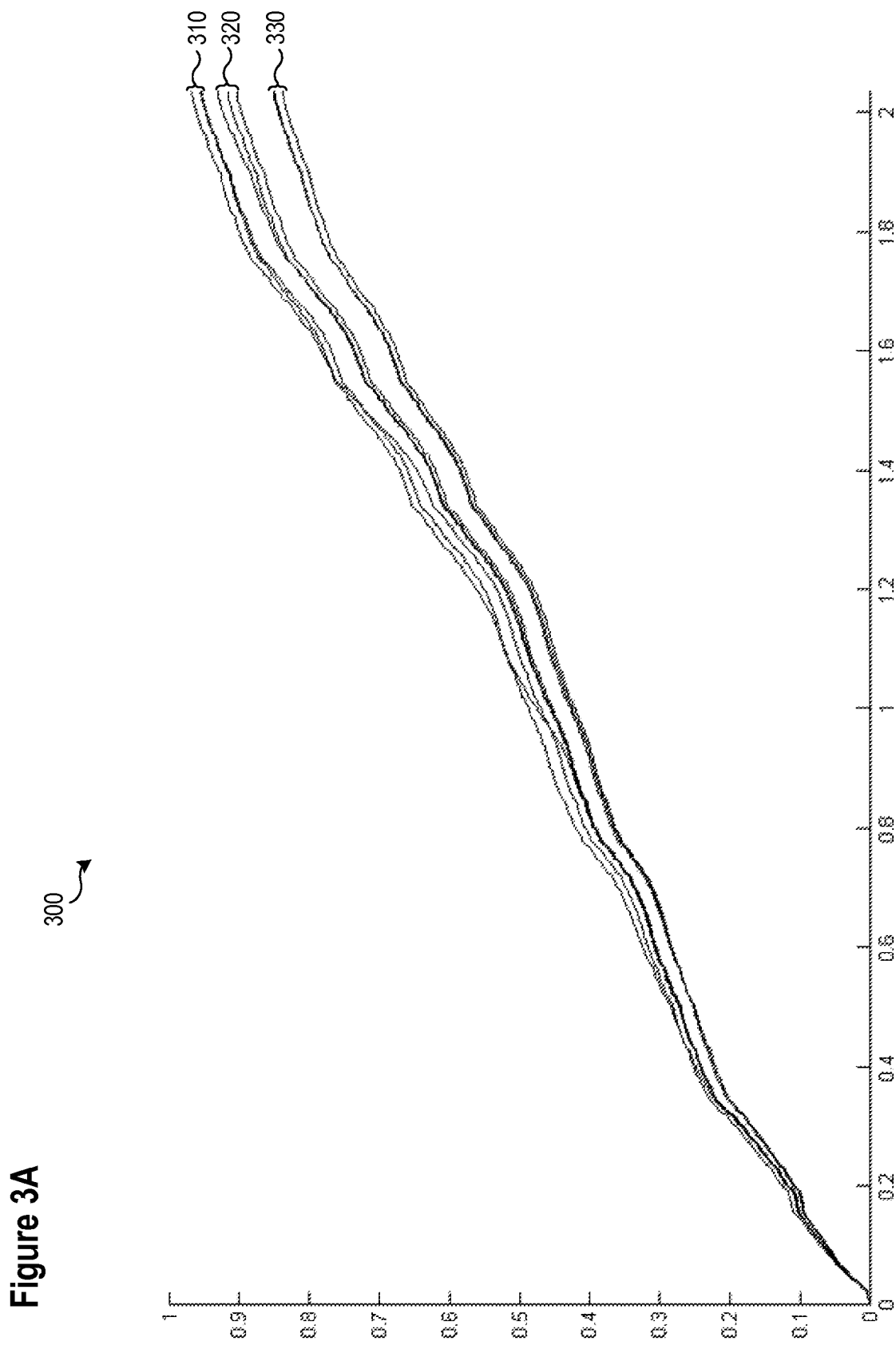
FIG. 3A illustrates a graph over time of a plurality of summation values associated with a plurality of subdivisions in a battery system consistent with various embodiments of the present disclosure.

FIG. 3A illustrates a graph 300 over time of a plurality of summation values associated with a plurality of subdivisions in a battery system consistent with various embodiments of the present disclosure. The data shown in FIG. 3A is derived from an exemplary battery system having three sections. Two of the three sections are newer than the third section. Battery capacity tends to degrade over time, and accordingly, the newer sections are likely to exhibit greater capacity than the older section. An identification of the battery subdivisions having the lowest capacity may provide information for use by a control system in order to prevent the lowest capacity subdivisions from becoming over-discharged. The data shown in FIG. 3A may be calculated using Eq. 1, Eq. 2, and Eq. 3.

Figure 3B:
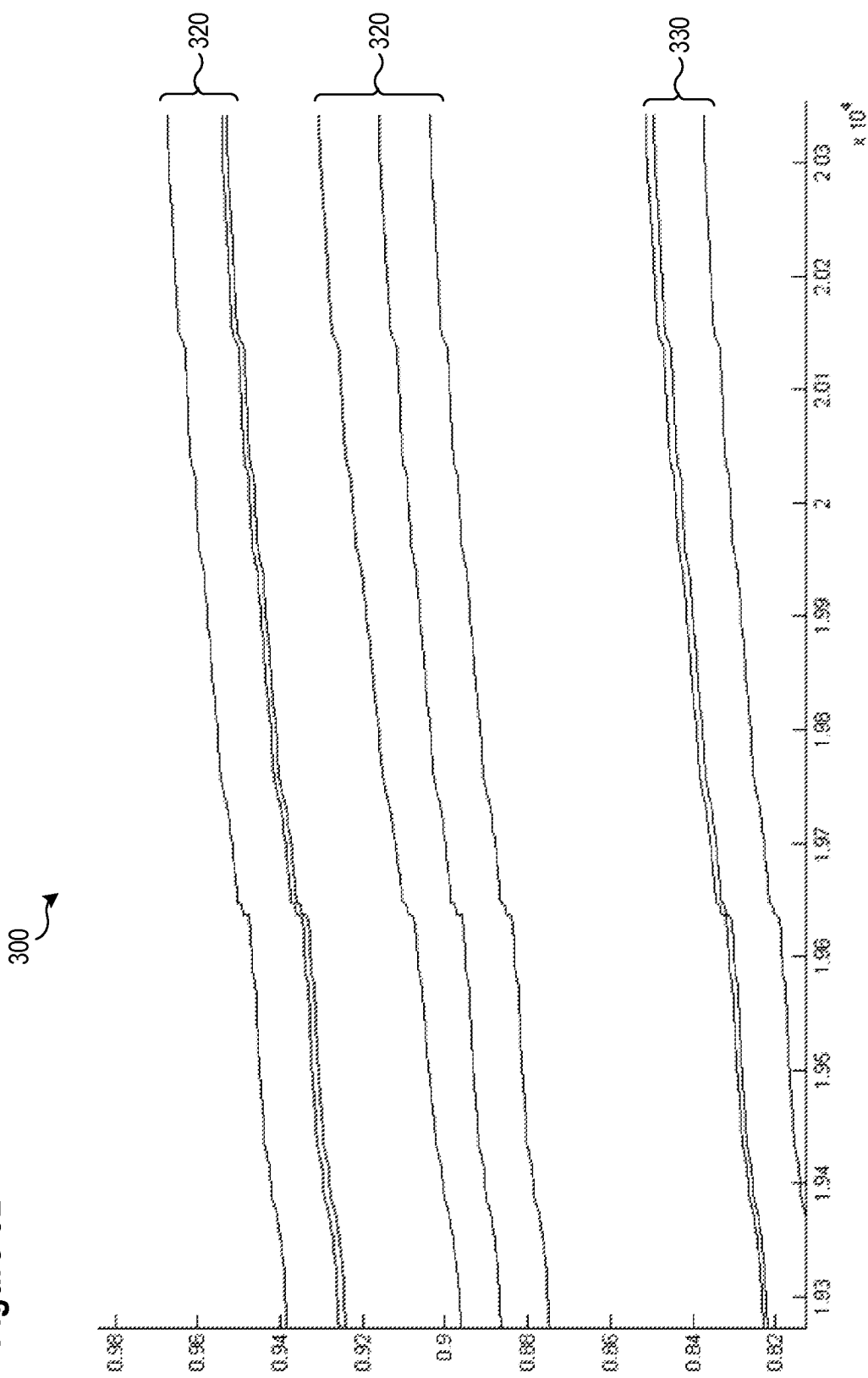
FIG. 3B illustrates a portion of the graph of FIG. 3A more clearly showing the divergence of summation values associated with battery subdivisions having different electrical energy storage capacities consistent with various embodiments of the present disclosure.

FIG. 3B illustrates a portion of the graph shown in FIG. 3A, and more clearly shows the divergence of summation values associated with battery subdivisions in the oldest section. Specifically, the data values designated at 310 show the greatest divergence and correspond to the battery subdivisions having the lowest capacity. In certain embodiments, these subdivisions may be physically located at the extreme ends of the oldest section. By virtue of their physical location, these sections may have been subject to the greatest temperature variation, which may also result in a degradation of electrical storage capacity. The data values designated at 320 show some divergence and correspond to battery subdivisions in the oldest section. The data values designated at 330 correspond to battery subdivisions that exhibit the greatest electrical storage capacity. The data values designated at 330 are located in the newest subdivisions.

A control system for a battery may utilize information of the type displayed in FIG. 3A to identify those battery subdivisions having the lowest capacity. The control system may implement control strategies to prevent over-discharge of those battery subdivisions exhibiting the lowest energy storage capacity. According to one embodiment, a control system may identify a subdivision corresponding to the largest summation value. The control system may further estimate a state of charge associated with the identified subdivision. When the state of charge of the identified subdivision falls below a threshold, a control system may prevent further depletion of battery system in order to protect the identified subdivision from over-discharge. Preventing over-discharge of the low-capacity subdivision may help to prevent damage to the low-capacity subdivision and to extend the useful life of the battery. Preventing further discharge based on the weakest subdivision may mitigate the occurrence of over-discharge in any subdivisions since other subdivisions have a greater electrical energy storage capacity.

Figure 4:
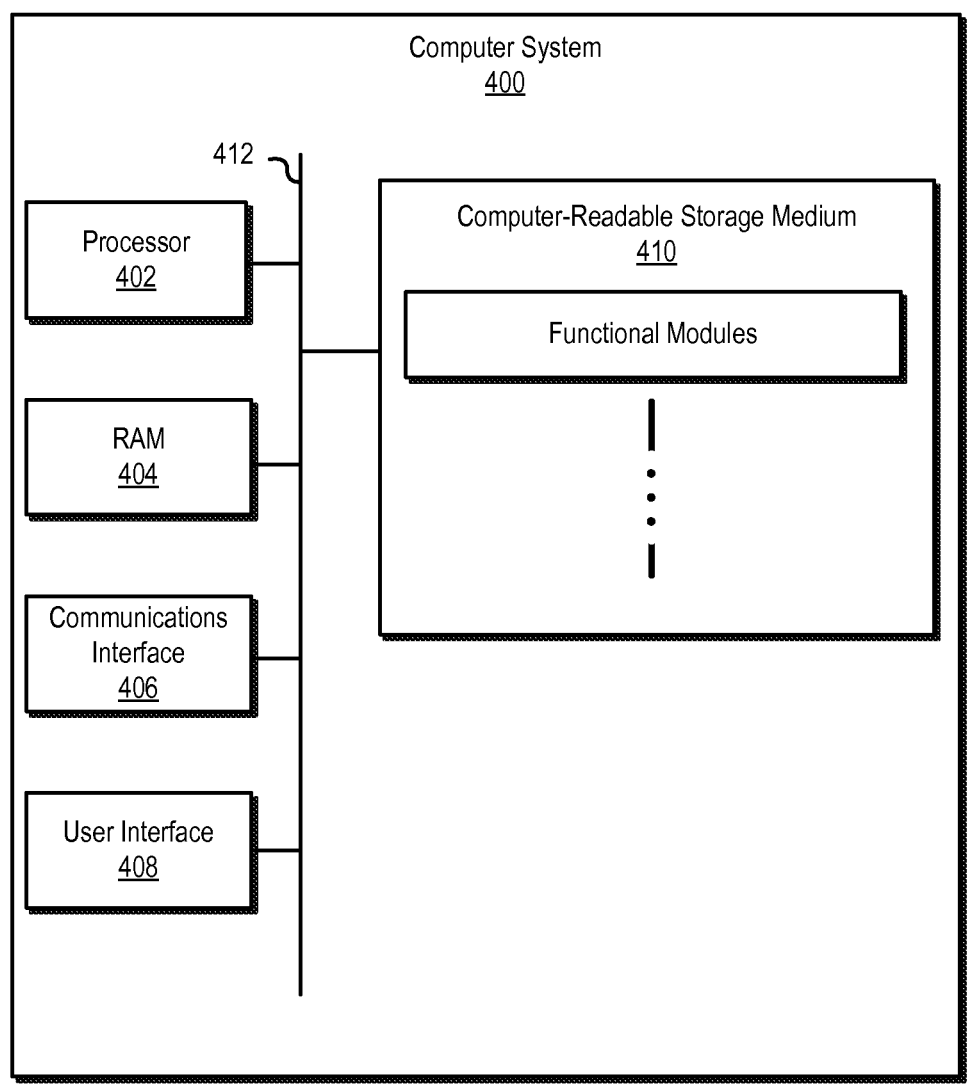
FIG. 4 illustrates a block diagram of a computer system for implementing certain embodiments of the systems and methods disclosed herein.

FIG. 4 illustrates a block diagram of a computer system 400 for implementing certain embodiments of the systems and methods disclosed herein. In certain embodiments, the computer system 400 may be a personal computer system, a server computer system, and/or any other type of system suitable for implementing the disclosed systems and methods. In further embodiments, the computer system 400 may be any portable electronic computer system or electronic device including, for example, a notebook computer, a smartphone, and/or a tablet computer.

As illustrated, the computer system 400 may include, among other things, one or more processors 402, random access memories (RAM) 404, communications interfaces 406, user interfaces 408, and/or non-transitory computer-readable storage mediums 410. The processor 402, RAM 404, communications interface 406, user interface 408, and computer-readable storage medium 410 may be communicatively coupled to each other via a common data bus 412. In some embodiments, the various components of the computer system 400 may be implemented using hardware, software, firmware, and/or any combination thereof.

The user interface 408 may include any number of devices allowing a user to interact with the computer system 400. For example, user interface 408 may be used to display an interactive interface to a user, including any of the visual interfaces disclosed herein. The user interface 408 may be a separate interface system communicatively coupled with the computer system 400 or, alternatively, may be an integrated system such as a display interface for a laptop or other similar device. In certain embodiments, the user interface 408 may be produced on a touch screen display. The user interface 408 may also include any number of other input devices including, for example, keyboard, trackball, and/or pointer devices.

The communications interface 406 may be any interface capable of communicating with other computer systems and/or other equipment (e.g., remote network equipment) communicatively coupled to computer system 400. For example, the communications interface 406 may allow the computer system 400 to communicate with other computer systems (e.g., computer systems associated with external databases and/or the Internet), allowing for the transfer as well as reception of data from such systems. The communications interface 406 may include, among other things, a modem, an Ethernet card, and/or any other suitable device that enables the computer system 400 to connect to databases and networks, such as LANs, MANs, WANs and the Internet.

The processor 402 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

The processor 402 may be configured to execute computer-readable instructions stored on the non-transitory computer-readable storage medium 410. Computer-readable storage medium 410 may store other data or information as desired. In some embodiments, the computer-readable instructions may include computer executable functional modules. For example, the computer-readable instructions may include one or more functional modules configured to implement all or part of the functionality of the systems and methods described above. Specific functional models that may be stored on computer-readable storage medium 410 include a calculation module, a battery control module, a capacity assessment module, and a state-of-charge estimation module. The calculation module may be configured, according to certain embodiments to calculate derivative values based upon measurements made by a measurement system. Further, the calculation module may generate summation values based upon the derivative values. The capacity assessment module may be configured to assess a relative capacity of two or more battery subdivisions. The state-of-charge estimation module may be configured to estimate a state-of-charge of one or more battery subdivisions based upon electoral parameters collected by the measurement system.

The system and methods described herein may be implemented independent of the programming language used to create the computer-readable instructions and/or any operating system operating on the computer system 400. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 400 may be in response to user commands, results of previous processing, or a request made by another processing machine. It will be appreciated that computer system 400 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. For example, in certain embodiments, the state of charge sensors may be configured to also incorporate features allowing measurement of internal battery section resistances. Similarly, the battery control system may be configured to incorporate certain features and/or functionality of the cell balancing system. Similarly, certain features of the embodiments disclosed herein may be configured and/or combined in any suitable configuration or combination. Additionally, certain systems and/or methods disclosed herein may be utilized in battery systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle system comprising:
a battery pack comprising a plurality of subdivisions;
a measurement system communicatively coupled to the battery pack configured to determine a first plurality of subdivision electrical parameters, each subdivision electrical parameter of the first plurality of electrical parameters being associated with one subdivision of the plurality of subdivisions;
a calculation system communicatively coupled to the measurement system configured to calculate a plurality of derivative values over a first portion of a life of the battery pack based upon the first plurality of subdivision electrical parameters, to calculate a first summation value based on the plurality of derivative values and to calculate a second summation value based on a plurality of derivative values associated with a second electrical parameter over the first portion of the life of the battery pack; and
a battery control system communicatively coupled to the calculation system, the battery control system configured to generate a command configured to control an aspect of an operation of the battery pack, the control command being generated at least in part based upon the first summation value and the second summation value.

2. The system of claim 1, wherein the calculation system is further configured to selectively exclude derivative values below a threshold from the plurality of derivative values.

3. The system of claim 1, wherein the calculation system is further configured to calculate a summation value of each of the plurality of subdivisions based on a plurality of derivative values associated with each of the plurality of subdivisions.

4. The system of claim 3, wherein battery control system is configured to identify a subdivision having the lowest electrical energy storage capacity based on an analysis of the summation value of each of the plurality of subdivisions.

5. The system of claim 1, further comprising a capacity assessment system configured to assess a capacity of a first subdivision relative to a second subdivision based upon a comparison of the first summation and the second summation.

6. The system of claim 4, further comprising:
a state-of-charge estimation system configured to estimate a state-of-charge of one of the first subdivision and the second subdivision;
wherein the aspect of operation of the battery pack control action comprises selectively preventing further discharge from the battery pack based on the relative capacity of the first subdivision with respect to the second subdivision and further based on the state-of-charge of one of the first subdivision and the second subdivision.

7. The system of claim 1, wherein at least one of the plurality of subdivisions of the battery pack is individually replaceable.

8. The system of claim 1, wherein the measurement system further comprises a plurality of voltage measurement sensors, and each subdivision electrical parameter of the first plurality of subdivision electrical parameters comprises a voltage associated with each of the plurality of subdivisions.

9. The system of claim 1, wherein each of the plurality of subdivisions comprises one or more battery cells.

10. The system of claim 1, wherein each of the plurality of subdivisions comprises one or more battery sub-packs, and each of the one or more battery-sub packs comprises one or more battery cells.

11. The system of claim 1, further comprising a non-transitory and non-volatile storage medium configured to store the first summation value and the second summation value from the first portion of the life of the battery pack; and
wherein the calculation system is further configured to calculate a third summation value during a second portion of the life of the battery pack based on the first summation value and to calculate a fourth summation value during the second portion of the life of the battery pack, the third summation value and the fourth summation value being further based on a second plurality of subdivision electrical parameters determined during the second portion of the life of the battery pack.

12. A method of controlling a battery pack in a vehicle that includes a plurality of subdivisions, the method comprising:
measuring a first plurality of subdivision electrical parameters using a measurement system, each subdivision electrical parameter of the plurality of electrical parameters being associated with one subdivision of the plurality of subdivisions;
calculating a plurality of derivative values over a portion of the life of the battery pack based on the first plurality of subdivision electrical parameters;
calculating a first summation value based on the plurality of derivative values;
calculating a second summation value based on a plurality of derivative values associated with a second electrical parameter over the portion of the life of the battery pack; and
executing a control action based at least in part on the first summation value and the second summation value.

13. The method of claim 12, further comprising selectively excluding derivative values below a threshold from the plurality of derivative values.

14. The method of claim 12, further comprising:
estimating a state-of-charge of one of the first subdivision and the second subdivision;
selectively preventing further discharge from the battery pack based on the capacity of the first subdivision relative to the second subdivision and based on the state of charge of one of the first subdivision and the second subdivision.

15. The method of claim 12, wherein the plurality of subdivision electrical parameters comprise a plurality of voltage measurements.

16. The method of claim 12, further comprising:
storing the first summation value and the second summation value from a first driving session;
measuring a second plurality of subdivision electrical parameters using the measurement system during a second driving session;
calculating a third summation value during the second driving session based on the first summation value and the second plurality of subdivision electrical parameters; and
calculating a fourth summation value during the second driving session based on the second summation value and the second plurality of subdivision electrical parameters.

17. A non-transitory computer-readable storage medium comprising instructions that, when executed by a processor, are configured to cause the processor to:
measure a first plurality of subdivision electrical parameters using a measurement system, each subdivision electrical parameter of the plurality of electrical parameters being associated with one subdivision of a plurality of subdivisions included in a vehicle battery system;
calculate a plurality of derivative values over a portion of a life of the battery pack based upon the plurality of subdivision electrical parameters;
calculate a first summation value based on the plurality of derivative values;
calculate a second summation value based on a plurality of derivative values associated with a second electrical parameter over the portion of the life of the battery pack; and
generate a control action based at least in part upon the first summation value and the second summation value.

18. The non-transitory computer-readable storage medium of claim 17, further comprising instructions that, when executed by the processor, are configured to cause the processor to:
selectively exclude derivative values below a threshold from the plurality of derivative values.

19. The non-transitory computer-readable storage medium of claim 17, further comprising instructions that, when executed by the processor, are configured to cause the processor to:
estimate a state-of-charge of one of the first subdivision and the second subdivision;
selectively prevent further discharge from the battery pack based upon the relative capacity of the first subdivision with respect to the second subdivision and based on the state-of-charge of one of the first subdivision and the second subdivision.

20. The non-transitory computer-readable storage medium of claim 17, further comprising instructions that, when executed by the processor, are configured to cause the processor to:
store the first summation value and the second summation value from the portion of the life of the battery pack;
measure a second plurality of subdivision electrical parameters using the measurement system during a second driving session;
calculate a third summation value during the second driving session based on the first summation value and the second plurality of subdivision electrical parameters; and
calculate a fourth summation value during the second driving session based on the second summation value and the second plurality of subdivision electrical parameters.

* * * * *